Feb. 27, 1923.
O. K. LUSCOMB
ELECTRICAL RECTIFIER
Filed May 19, 1919
1,446,757
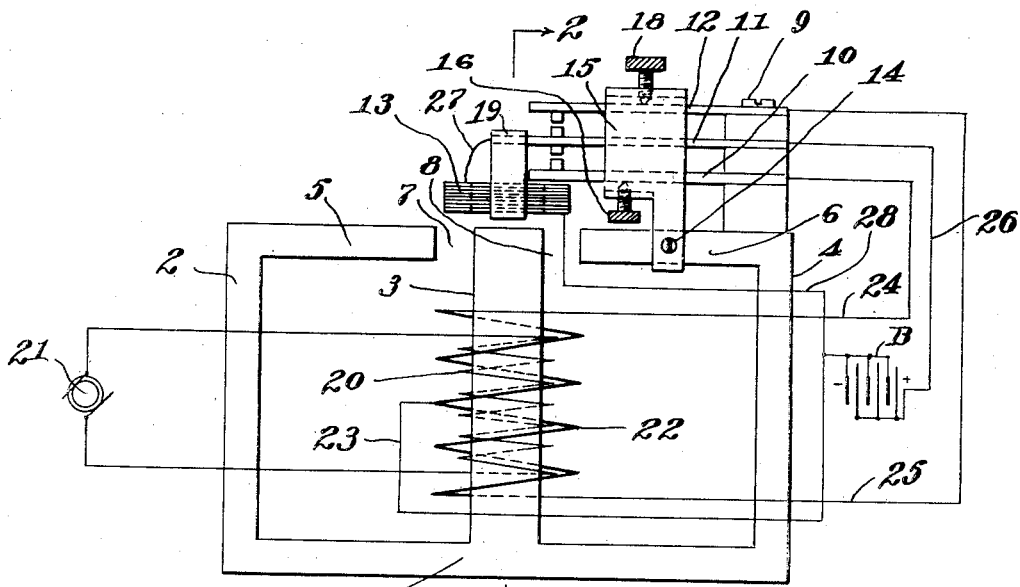
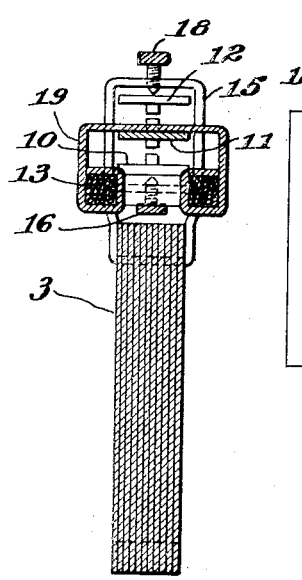
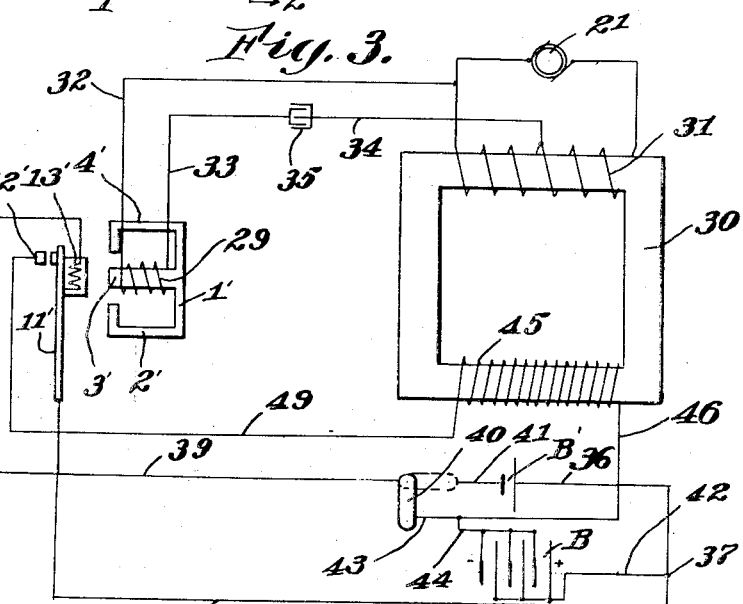
Inventor:
Otis Kerro Luscomb
by Roberts Roberts & Cushman
attys.

Patented Feb. 27, 1923.

1,446,757

UNITED STATES PATENT OFFICE.

OTIS KERRO LUSCOMB, OF ALLSTON, MASSACHUSETTS.

ELECTRICAL RECTIFIER.

Application filed May 19, 1919. Serial No. 298,131.

*To all whom it may concern:*

Be it known that I, OTIS KERRO LUSCOMB, a citizen of the United States of America, and resident of Allston, in the county of Suffolk and State of Massachusetts, have invented new and useful Improvements in Electrical Rectifiers, of which the following is a specification.

This invention relates to electrical rectifying apparatus for converting alternating current into direct or unidirectional current for many of the purposes for which direct current is necessary, such for example as for charging storage batteries, and more particularly to apparatus of the type commonly known as vibrating rectifiers. In apparatus of this nature a contact-carrying member is caused to oscillate or vibrate in synchronism with the changes in direction of the alternating current supply and shift the circuit connections in such manner as to produce unidirectional current in an external or load circuit. Such apparatus is adapted to be employed in connection with a transformer designed to change the ordinary commercial voltage to the voltage desired for rectification. The transformer may or may not be an integral part of the apparatus. If the apparatus is separate from the transformer, a shunt circuit is provided to energize the apparatus and produce an alternating flux to operate the vibratory member. If however the apparatus is combined with the transformer the primary of the transformer serves as an energizing circuit for producing an alternating flux in the transformer core which acts directly on the vibratory member.

It has been customary to provide a vibratory armature polarized by a permanent magnet, which armature vibrates in step with alternations of the flux in the magnetic circuit with which it cooperates. Difficulty is experienced with such rectifiers due to the fact that the permanent magnets often lose their polarity and thereby render the apparatus useless. It has also been proposed to polarize the vibrating armature by means of an electro-magnet instead of a permanent magnet, but this scheme is also unsuited to many uses owing to the weight of the vibrating armature and magnet.

One object of my invention is to avoid the necessity of a permanent magnet, by substituting for the armature and permanent magnet, a light coil energized by direct current and mounted to vibrate in step with alternations of flux in the magnetic circuit with which it co-operates. A further object of the invention is to reduce the weight of the vibratory parts of the apparatus thereby to render the rectifier more quickly responsive to current alternations. A further object of the invention is to provide means for compensating for the lagging of vibratory parts of the rectifier behind the current alternations. A still further object of the invention is to provide novel circuit arrangements and improved and simplified construction of the apparatus whereby the change of the current from alternating to direct may be effected economically and efficiently.

In order to set forth the nature of my invention, I have illustrated certain embodiments thereof in the accompanying drawings in which—

Fig. 1 is a somewhat diagrammatic view of one embodiment of my invention showing one set of circuit connections;

Fig. 2 is a section on line 2—2 of Fig. 1; and

Fig. 3 is a diagrammatic view of a further embodiment of my invention showing a different set of circuit connections.

As illustrated in Fig. 1, I have combined the customary transformer and my improved rectifying apparatus in a single structure, the core of the transformer also serving as a magnetic circuit for the rectifying apparatus. The transformer comprises a laminated core 1 of substantially E-shape, having three limbs 2, 3 and 4, the extremities of the two outer limbs turning inwardly as at 5 and 6 into proximity with the end of the central limb 3, thereby forming two air gaps 7 and 8. Secured upon the inturned end 6 of the limb 4 by screw 9 and insulated therefrom and from each other, are three contact springs 10, 11 and 12 of diamagnetic material. The middle spring 11 is extended inwardly beyond the springs 10 and 12 and supports a coil 13 of fine wire directly over the central limb 3. Secured to the end 6 by screw 14 is a yoke 15 embracing said contact springs and provided with stop screws 16 and 18 co-operating with the outer springs 10 and 12 respectively for restraining their movement and adjusting their relation to the center spring 11. The coil 13 is secured to the spring 11 by a strap 19 which encircles the opposite sides of the coil and is riveted or otherwise attached to spring 11 as clearly shown in Fig. 2. The primary winding 20 which surrounds the central limb 3 is connected to the source of alternating current 21. The middle point of the secondary 22 of the transformer, which is also wound around the central limb 3, is connected to conductor 23 forming a part of the external circuit which is to be supplied with unidirectional current. This circuit may include a storage battery B or any current consuming device desired. The ends of the secondary winding are connected to contact springs 10 and 12, by conductors 24 and 25 respectively. Contact spring 11 is connected by conductor 26 to the battery B or other current consuming device. The coil 13 is connected to one terminal of battery B through conductor 27, contact spring 11 and conductor 26, and to the other terminal of the battery through conductor 28.

With this arrangement of apparatus it is evident that alternating current from the source 21 flowing through the primary winding of the transformer sets up alternating magnetic flux in two paths, one through the central limb 3, across air-gap 7, through outer limb 2 and its extension 5, and thence back to limb 3, and the other through central limb 3, across air-gap 8, through outer limb 4 and its extension 6 and thence back to limb 3. This flux in the region of the air-gaps 7 and 8 will pass through and beneath the coil 13 causing the coil to vibrate in step with the alternations of the alternating current source, thus vibrating the spring 11 which supports the coil, first into contact with spring 10 and then into contact with spring 12.

Assuming that at a given instant the current induced in the secondary winding is flowing upward in the coil and the coil 13 is so energized by the battery B as to be attracted toward the core 1, then contacts 10 and 11 will be closed and an impulse of current will flow from the upper terminal of the secondary winding through conductor 24, springs 10 and 11, conductor 26 to the positive pole of battery B, and from the negative pole through conductor 23 back to the midpoint of the secondary. At the next instant or during the next half cycle of the alternating current flowing in the primary, the direction of current in the secondary will be reversed and coil 13 will be repelled closing contacts 11 and 12. Current will now flow from the lower terminal of the secondary through conductor 25, springs 12 and 11 to the positive pole of battery B and from the negative pole through conductor 23 back to the midpoint of the secondary. Current therefore flows in the same direction through the external circuit throughout an entire cycle of the alternating current. This cycle is rapidly repeated and in this manner unidirectional current is caused to flow through the external circuit charging battery B or performing other useful work.

It will be observed that the coil 13 is connected in parallel with the battery B relatively to the secondary circuit and that unidirectional current is therefore supplied to the coil 13 as well as to the battery B from the secondary circuit. It will also be observed that the vibrator comprises no armature but merely a small coil of wire with an air-core, the coil being associated with the air-gap of the transformer so as to be oscillated by the stray flux in the region of the gap.

In Fig. 3 I have illustrated another embodiment of my invention in which I have shown a rectifier having a magnetic circuit separate from the magnetic circuit of the transformer. Inasmuch as no voltage transformation takes place in the rectifier, in this embodiment it is unnecessary to provide the rectifier with a large magnetic circuit as in the embodiment of Fig. 1. I therefore provide the rectifier with a relatively small laminated magnetic circuit 1' of substantially the same shape as shown in Fig. 1 and wind upon the central limb 3' thereof an energizing winding 29. On the transformer core 30 is wound a primary coil 31 connected at its terminals with a supply source 21 of alternating current. The winding 29 is connected to the alternating current circuit in any suitable manner, depending upon the voltage for which the winding is adapted, and in Fig. 3 I have shown the winding 29 connected by conductors 32, 33 and 34 between one side of the primary circuit and the midpoint of the transformer primary so that the winding is energized from the source 21 at a potential substantially less than the potential of the source.

Coil 13' (which may be identical with coil 13 of Fig. 1) is mounted on and electrically connected by one of its terminals to spring contact 11' and under the influence of the alternating magnetic flux in the core 1' periodically closes contacts 11' and 12'.

Interposed in the circuit of winding 29 is a reactance device 35, in this instance shown as a condenser. The purpose of this reactance is to displace the phase of the current flowing in the energizing winding 29 to compensate for the inertia of the vibratory elements 11' and 13' of the rectifier so that the contacts 11' and 12' will be opened and closed when substantially no current is flowing in the secondary.

Coil 13' may be energized by direct current from the battery B' over a circuit extending from the positive pole of battery B', conductor 36, junction 37, conductor 38, coil 13' conductor 39, switch arm 40 in its dotted line position, and conductor 41 back to the negative pole of the battery; or, after the rectifier has operated sufficiently partially to charge battery B, over a circuit extending from the positive pole of battery B, conductor 42, junction 37, conductor 38, coil 13′, conductor 39, switch arm 40 in its full line position, conductor 43, and conductor 44 back to the negative pole of battery B. Inasmuch as this circuit is in parallel with the battery B, relatively to the transformer secondary, the coil 13′ is energized in response to the secondary current while the battery B is being charged.

Vibrations of coil 13′ in step with alternations of flux in core 1′, periodically close contacts 11′ and 12′ in the external circuit comprising the secondary winding 45 of the transformer, conductor 46, conductor 44, battery B, conductor 42, junction 37, conductor 38, contacts 11′ and 12′ and conductor 49, thus setting up pulsating unidirectional current in the external circuit.

While I have illustrated the rectifier of Fig. 3 as adapted to utilize only alternate half cycles of the alternating current wave it is obvious that the entire current wave could be utilized by supplying the rectifier with contacts on both sides of the vibratory contact 11 and with circuit connections to the secondary of the transformer similar to those shown in Fig. 1.

It is obvious that the described apparatus may also be used for transforming direct current into alternating current.

I claim:—

1. In an electrical rectifier, means for producing an alternating magnetic field, a coil having a diamagnetic core, said coil being mounted in said field to vibrate in step with the magnetic alternations of said field, switch contacts, and means responsive to the vibration of said coil for controlling said contacts.

2. In an electrical rectifier, means for generating an alternating magnetic flux, a coil having an air core, said coil being free to vibrate in step with the magnetic alternations of said means, means for energizing said coil, switch contacts, and means responsive to the vibration of said coil for controlling said contacts.

3. In an electrical rectifier means for producing an alternating magnetic field, a coil mounted to vibrate in step with the magnetic alternations of said field and transversely thereof, switch contacts, means responsive to the vibration of said coil for actuating said contacts, and circuit connections for passing said impulses through said coil.

4. In an electrical rectifier, means for producing an alternating magnetic field, a coil mounted to vibrate in step with the magnetic alternations of said field and at one side thereof, means for energizing said coil, switch contacts, and means responsive to the vibration of said coil for causing said contacts to deliver unidirectional current impulses.

5. In an electrical rectifier, an E-shaped electromagnet the limbs of which form magnetic circuits having air-gaps at the free ends thereof, an energizing winding on the center limb of said magnet adapted to be energized by a source of alternating current for producing alternating magnetic flux in said circuits, a freely vibratable coil mounted adjacent the said air-gaps, a source of direct current connected with said coil, switch contacts, and means responsive to the vibration of said coil for causing said contacts to deliver unidirectional current impulses.

6. In an electrical rectifier, an E-shaped electromagnet the outer limbs of which extend inwardly into proximity with the center limb forming a branched magnetic circuit, an energizing winding on said center limb adapted to be energizing by alternating current for producing alternating magnetic flux in said circuit, a freely vibratable coil mounted adjacent said center limb, switch contacts, means responsive to the vibration of said coil for actuating said contacts, and circuit connections for passing said impulses through said coil.

7. In an electrical rectifier, an electromagnet the poles of which form a magnetic circuit substantially closed except for an air-gap, an energizing winding on said magnet adapted for producing an alternating magnetic flux in said circuit, a coil adapted to freely vibrate adjacent said air-gap, a source of direct current connected with said coil, a reed having a natural period of vibration substantially equal to the frequency of said source of alternating current supporting said coil, and contacts actuated by said reed when said coil vibrates for delivering unidirectional current impulses.

8. In an electrical rectifier, an electromagnet having a magnetic circuit substantially closed except for an air-gap, means for producing a magnetic flux in said circuit, a coil adapted to freely vibrate adjacent said air-gap, a reed of diamagnetic material for supporting said coil, a clip attached to the free end of said reed and encircling the convolutions of said coil for securing said coil to the reed, contacts actuated by said reed when said coil vibrates, and circuit connections for connecting said contacts with said coil to energize the coil.

Signed by me at Boston, Massachusetts, this fifteenth day of May, 1919.

O. KERRO LUSCOMB.